United States Patent
Hill et al.

(10) Patent No.: US 11,020,687 B2
(45) Date of Patent: Jun. 1, 2021

(54) METHODS FOR SCALING BETWEEN CHROMATOGRAPHIC SYSTEMS USING HIGHLY COMPRESSIBLE FLUIDS

(71) Applicant: Waters Technologies Corporation, Milford, MA (US)

(72) Inventors: Jason F. Hill, Milford, MA (US); Michael O. Fogwill, South Grafton, MA (US); Joseph D. Michienzi, Plainville, MA (US); Joshua A. Shreve, Franklin, MA (US); Abhijit Tarafder, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 413 days.

(21) Appl. No.: 15/948,666

(22) Filed: Apr. 9, 2018

(65) Prior Publication Data
US 2018/0326324 A1   Nov. 15, 2018

Related U.S. Application Data

(60) Provisional application No. 62/488,022, filed on Apr. 20, 2017.

(51) Int. Cl.
*B01D 15/40* (2006.01)
*G01N 30/32* (2006.01)
(Continued)

(52) U.S. Cl.
CPC .......... *B01D 15/40* (2013.01); *B01D 15/163* (2013.01); *G01N 30/32* (2013.01);
(Continued)

(58) Field of Classification Search
CPC ...... B01D 15/40; B01D 15/163; B01D 15/08; B01D 15/16; B01D 15/22; G01N 30/8672;
(Continued)

(56) References Cited

U.S. PATENT DOCUMENTS 5,405,432 A * 4/1995 Snyder ............... G01N 30/8658
95/82
5,958,246 A * 9/1999 Tipler .................... G01N 30/62
210/656

(Continued)

FOREIGN PATENT DOCUMENTS

| WO | 2014201222 A1 | 12/2014 |
| WO | 2015023533 A1 | 2/2015 |
| WO | 2018/052952 A1 | 3/2018 |

OTHER PUBLICATIONS

Aistars, Arnie. Managing Method Transfer in the Pharmaceutical Laboratory. Waters Technology, (2015) 48 pages. (Year: 2015).*

(Continued)

*Primary Examiner* — Katherine Zalasky McDonald
(74) *Attorney, Agent, or Firm* — Womble Bond Dickinson (Us) LLP; Deborah M. Vernon; Heath T. Misley

(57) ABSTRACT

Methods for transferring a separation procedure from a first chromatographic system to a second one are disclosed that involve substantially matching a pressure profile. In some such methods, a length, an area, and a particle size of a first column in the first system and a flow rate in the first separation procedure are identifiable. Some such methods also involve selecting a combination of a length, an area, and a particle size of a second column in the second system and a flow rate for the second separation procedure. These methods may involve calculating a target length, a target area, or a target particle size for the second column in the second system or a target flow rate for the second separation procedure.

9 Claims, 9 Drawing Sheets

(51) Int. Cl.
*G01N 30/86* (2006.01)
*B01D 15/16* (2006.01)
*G01N 30/60* (2006.01)
*G01N 30/30* (2006.01)
*G01N 30/02* (2006.01)

(52) U.S. Cl.
CPC ..... *G01N 30/6039* (2013.01); *G01N 30/8658* (2013.01); *G01N 30/8672* (2013.01); *G01N 30/30* (2013.01); *G01N 30/60* (2013.01); *G01N 30/8668* (2013.01); *G01N 30/8693* (2013.01); *G01N 2030/027* (2013.01); *G01N 2030/324* (2013.01); *G01N 2030/8648* (2013.01)

(58) Field of Classification Search
CPC ........... G01N 30/8658; G01N 30/6039; G01N 30/32; G01N 30/30; G01N 30/8693; G01N 30/8668; G01N 30/60; G01N 2030/324; G01N 2030/8648; G01N 2030/027
See application file for complete search history.

(56) References Cited

U.S. PATENT DOCUMENTS

| | | | | |
|---|---|---|---|---|
| 2002/0010566 | A1* | 1/2002 | Chester | G01N 30/8693 703/2 |
| 2003/0110000 | A1 | 6/2003 | Quimby et al. | |
| 2012/0285223 | A1* | 11/2012 | Andrews | G01N 30/04 73/61.53 |
| 2016/0136544 | A1* | 5/2016 | Hudalla | B01D 15/40 210/656 |
| 2016/0199751 | A1* | 7/2016 | Shreve | G01N 30/32 210/656 |
| 2020/0217825 | A1* | 7/2020 | Shreve | G01N 30/8658 |

OTHER PUBLICATIONS

Majors, Ronald E. Method Translation in Liquid Chromatography. Agilent Technologies, Aug. 25, 2015, 12 pages. (Year: 2015).*
McKeown, Alan P. Translating Monograph Chromatography Methods to Smaller Dimension cols. with Porous and Solid Core particles Using new Guidance from USP <621>. Chromatography Today, Feb./Mar. 2015, 5 pages. (Year: 2015).*
Neue et al. Transfer of HPLC Procedures to Suitable Columns of Reduced Dimensions and Particle Sizes. Pharmacopeial Forum, vol. 35(6) [Nov.-Dec. 2009], 1622-1626. (Year: 2009).*
Petersson et al. Differing Liquid Chromatography Formats: Advantages, Principles, and Possible Pitfalls. LCGS Europe, vol. 28, Issue 6; Jun. 12, 2015, 310-320. (Year: 2015).*
Restek, "Systematic transfer of HPLC methods to UHPLC," (2008), 4 pages. (Year: 2008).*
USP, <621> Chromatography, May 1, 2012, 8 pages. (Year: 2012).*
Enmark, M. et al., "Evaluatin of scale-up from analytical to preparative supercritical fluid Chromatography", Journal of chromatography A, vol. 1425, pp. 280-286, (2015).
Tarafder, et al., "A scaling rule in supercritical fluid chromatography. I. Theory for isocratic systems." Journal of Chromatography A, vol. 1362 (2014) 278-293.
Written Opinion and International Search Report relating to International Application No. PCT/IB2018/0582465, dated Aug. 21, 2018.

* cited by examiner

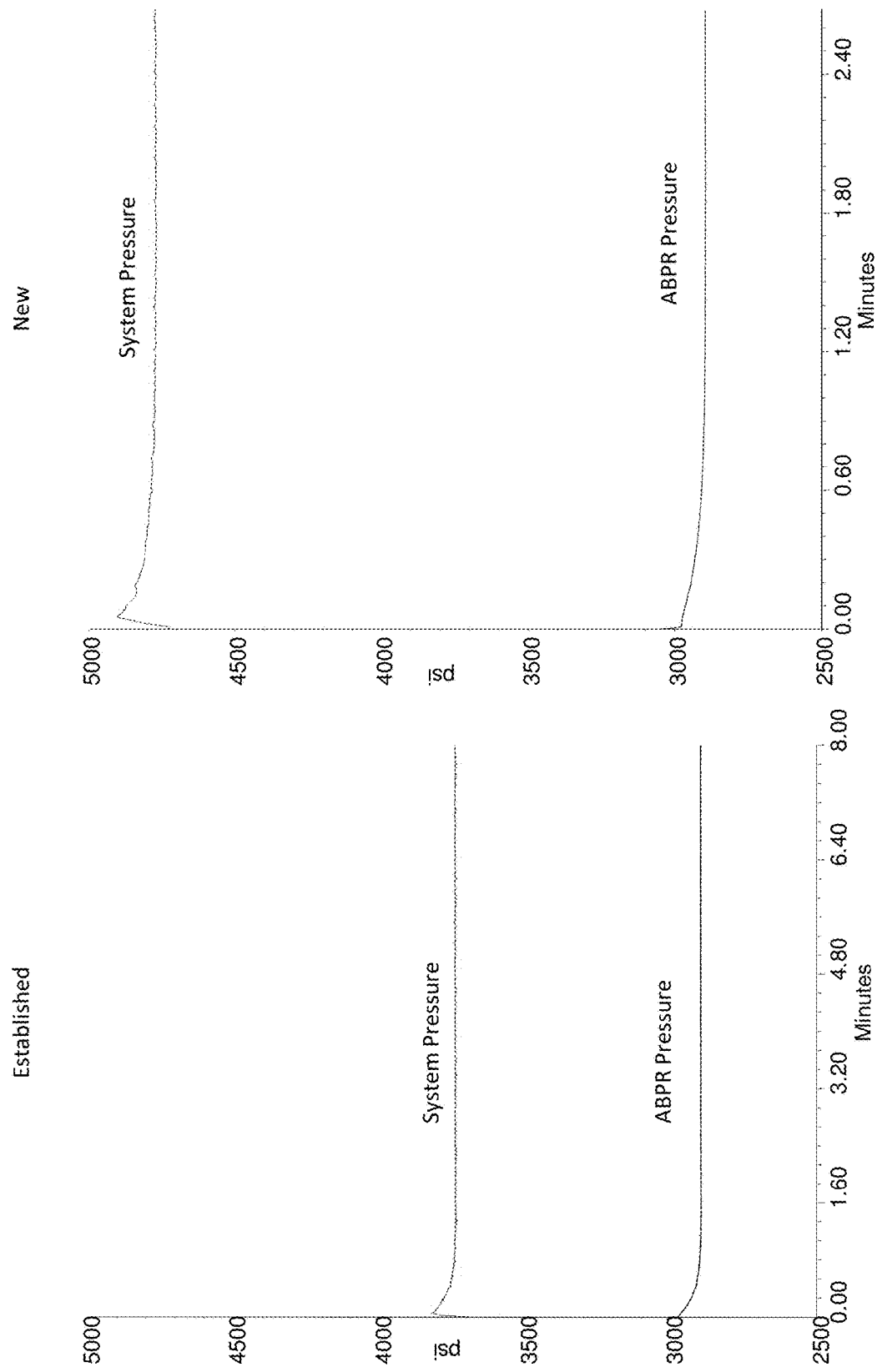

METHODS FOR SCALING BETWEEN CHROMATOGRAPHIC SYSTEMS USING HIGHLY COMPRESSIBLE FLUIDS

RELATED APPLICATIONS

This application claims priority to and the benefit of U.S. Provisional Patent Application No. 62/488,022 titled "METHODOLOGIES FOR SCALING METHODS BETWEEN CHROMATOGRAPHIC SYSTEMS USING HIGHLY COMPRESSIBLE FLUIDS" filed Apr. 20, 2017, which is incorporated herein by reference in its entirety.

TECHNICAL FIELD

The present disclosure relates to supercritical fluid chromatography (SFC) and/or a carbon dioxide based chromatography system. More specifically, the present disclosure relates to methods and systems for controlling the density of the mobile phase in the region of interest of a chromatographic system.

BACKGROUND OF THE INVENTION

Developing a successful chromatographic separation method usually requires extensive experimentation. Such method development often involves the evaluation and optimization of numerous variables. These variables may include the choice of chromatographic system (e.g., carbon dioxide based chromatography, SFC, high pressure liquid chromatography (HPLC), gas chromatography (GC)), the choice of mobile phase and mobile phase compositions, the choice of column chemistry and column dimensions, the choice of detector, etc. Once a successful chromatographic separation method has been developed, it often needs to be transferred and performed on different chromatographic systems. For example, separation on an analytical scale SFC system may need to be transferred and performed on a preparative scale SFC system. Similarly, a preparative scale SFC system may be modified thereby requiring the new separation method to be transferred and performed on a different preparative scale SFC system.

For liquid chromatography (LC), the theory and understanding for transferring methods between different system or column configurations is generally well understood. Guidelines for transferring LC methods are straightforward and typically do not need additional optimization.

When employing a SFC and/or a carbon dioxide based chromatography system, however, effective separation method transfer between different chromatography systems requires special consideration. Chromatographic separations using a mobile phase comprising carbon dioxide that are transferred from one chromatographic system to another chromatographic system typically may need to be re-developed to achieve the same successful separation as achieved on the original chromatographic system.

In WO2014/201222 A1, researchers at Waters Technologies Corporation disclosed a methodology for scaling SFC and/or carbon dioxide based chromatography methods between different systems and/or column configurations. The methodology includes measuring an average mobile phase density from the density profile along the system during a first separation utilizing carbon dioxide as a mobile phase component and substantially duplicating the average density for a second separation to produce similar selectivity and retention factors. The researchers at Waters Technologies Corporation also disclosed that the average of the pressure profile may be used as a close approximation to duplicate the average of the density profiles between separations.

In WO2015/023533 A1, researchers at Waters Technologies Corporation disclosed apparatus for regulating the average mobile phase density or pressure in a carbon dioxide based chromatographic system. The disclosed apparatus includes a controller, a set of pressure or density sensors and a set of instructions capable of determining the pressure drop across a column and adjusting at least one system component or parameter to achieve a predetermined average mobile phase density or pressure in the system. But since filing WO2015/023533 A1, researchers at Waters Technologies Corporation have discovered specific new ways to efficiently transfer a carbon dioxide-based separation procedure from a first chromatographic system to a second system.

SUMMARY OF THE INVENTION

The present disclosure relates to methods and systems for efficiently transferring a separation procedure comprising a carbon dioxide based mobile phase from a first chromatographic system to a second chromatographic system.

Some methods in accordance with the invention involve identifying a length, a cross-sectional area, and a particle size for a first column and a flow rate for a carbon dioxide based mobile phase in a first separation procedure in the first chromatographic system. Some such methods involve selecting a combination of a length, a cross-sectional area, and a particle size for the second column and a flow rate for the carbon dioxide based mobile phase in the separation procedure in the second chromatographic system such that the pressure profile for the separation procedure in the second chromatographic system substantially matches the pressure profile for the separation procedure in the first chromatographic system. In some such methods, the pressure profile in the separation procedure in the first chromatographic system is represented by the quotient of a dividend of the product of the flow rate for the carbon dioxide based mobile phase in the separation procedure and the length of the first column and a divisor of the product of the cross-sectional area and the square of particle size of the first column. In some such methods, the pressure profile in the separation procedure in the second chromatographic system is represented by the quotient of a dividend of the product of the flow rate for the carbon dioxide based mobile phase in the separation procedure and the length of the second column and a divisor of the product of the cross-sectional area and the square of particle size of the second column.

Some methods in accordance with the invention involve identifying a length, a cross-sectional area, and a particle size for a second column in the second chromatographic system. In such methods, selecting a combination of a length, a cross-sectional area, and a particle size for the second column and a flow rate for the carbon dioxide based mobile phase in the separation procedure in the second chromatographic system may comprise selecting a target flow rate for a carbon dioxide based mobile phase in a separation procedure in the second chromatographic system such that the pressure profile in the separation procedure in the second chromatographic system substantially matches the pressure profile in the separation procedure in the first chromatographic system. The target flow rate may be based on the product of (a) the flow rate for the carbon dioxide based mobile phase in the separation procedure in the first chromatographic system, (b) the quotient of a dividend of the length of the first column and a divisor of the length of the second column, and (c) the quotient of a dividend of the area of the second column and a divisor of the area of the first column, and (d) the square of the quotient of a dividend of the size of the particles in the second column and a divisor of the size of the particles in the first column.

Some methods in accordance with the invention involve identifying a length and a particle size for a second column in the second chromatographic system and a flow rate for a carbon dioxide based mobile phase in a separation procedure in the second chromatographic system. In such methods, selecting a combination of a length, a cross-sectional area, and a particle size for the second column and a flow rate for the carbon dioxide based mobile phase in the separation procedure in the second chromatographic system may comprise selecting target cross-sectional area for the second column in the second chromatographic system such that the pressure profile in the separation procedure in the second chromatographic system substantially matches the pressure profile in the first separation procedure in the first chromatographic system. The target cross-sectional area may be based on the product of (a) the cross-sectional area for the first column in the first chromatographic system, (b) the quotient of a dividend of the length of the second column and a divisor of the length of the first column, and (c) the quotient of a dividend of the flow rate for the carbon dioxide based mobile phase in the separation procedure in the second chromatographic system and a divisor of the flow rate for the carbon dioxide based mobile phase in the separation procedure in the first chromatographic system, and (d) the square of the quotient of a dividend of the size of the particles in the first column and a divisor of the size of the particles in the second column.

Some methods in accordance with the invention involve identifying a cross-sectional area and a particle size for a second column and a flow rate for the carbon dioxide based mobile phase in a separation procedure in the second chromatographic system. In such methods, selecting a combination of a length, a cross-sectional area, and a particle size for the second column and a flow rate for the carbon dioxide based mobile phase in the separation procedure in the second chromatographic system may comprise selecting a target length for the second column in the second chromatographic system such that the pressure profile in the separation procedure in the second chromatographic system substantially matches the pressure profile in the first separation procedure in the first chromatographic system. The target length for the second column may be based on the product of (a) the length of the first column in the first chromatographic system, (b) the quotient of a dividend of the area of the second column and a divisor of the area of the first column, and (c) the quotient of a dividend of the flow rate for the carbon dioxide based mobile phase in the separation procedure in the first chromatographic system and a divisor of the flow rate for the carbon dioxide based mobile phase in the separation procedure in the second chromatographic system, and (d) the square of the quotient of a dividend of the size of the particles in the second column and a divisor of the size of the particles in the first column.

Some methods in accordance with the invention involve identifying a cross-sectional area and a length for a second column and a flow rate for the carbon dioxide based mobile phase in a separation procedure in the second chromatographic system. In such methods, selecting a combination of a length, a cross-sectional area, and a particle size for the second column and a flow rate for the carbon dioxide based mobile phase in the separation procedure in the second chromatographic system may comprise selecting a target particle size for the second column in the second chromatographic system such that the pressure profile in the separation procedure in the second chromatographic system substantially matches the pressure profile in the first separation procedure in the first chromatographic system. The target particles size for the second column may be based on the product of (a) the particle size of the first column in the first chromatographic system, and (b) the square root of the product of (1) the quotient of a dividend of the flow rate for the carbon dioxide based mobile phase in the separation procedure in the second chromatographic system and a divisor of the flow rate for the carbon dioxide based mobile phase in the separation procedure in the first chromatographic system, (2) the quotient of a dividend of the length of the second column and a divisor of the length of the first column, and (3) the quotient of a dividend of the cross-sectional area of the first column and a divisor of the cross-sectional area of the second column.

Some methods in accordance with the invention comprise a method for efficiently transferring a separation procedure from a first chromatographic system comprising a constant flow pump and a first column to a second chromatographic system comprising a constant pressure pump and a second column. Some such methods involve identifying a pressure near the outlet of the constant flow pump in the first chromatographic system during the first separation procedure. Some such methods involve further involve selecting a pressure setting for the constant pressure pump in the separation procedure in the second chromatographic system that substantially matches the pressure near the outlet of the constant flow pump in the first chromatographic system during the first separation procedure.

Some systems in accordance with the invention involve are systems for efficiently transferring a separation procedure from a first chromatographic system comprising a first column to a second chromatographic system comprising a second column. Some such systems comprise a second column and instructions for selecting a flow rate for a separation procedure in the second chromatographic system. The second column comprises a length, a cross-sectional area, and/or a particle size that differs from that of the first column of first chromatographic system. The instructions for selecting a flow rate enable the pressure profile in the separation procedure in the second chromatographic system to substantially match the pressure profile in the separation procedure in the first chromatographic system. The pressure profile in the separation procedure in the first chromatographic system is represented by the quotient of a dividend of the product of the flow rate for the carbon dioxide based mobile phase in the separation procedure in the first chromatographic system and the length of the first column and a divisor of the product of the cross-sectional area and the square of particle size of the first column. The pressure profile in the separation procedure in the second chromatographic system is represented by the quotient of a dividend of the product of the flow rate for the carbon dioxide based mobile phase in the separation procedure in the second chromatographic system and the length of the second column and a divisor of the product of the cross-sectional area and the square of particle size of the second column.

In some embodiments of the invention, a pressure setting of a back pressure regulator in the second separation procedure in the second chromatographic system substantially matches a pressure setting of a back pressure regulator in the first separation procedure in the first chromatographic system. In some embodiments of the invention, a packing bed density of the second column is substantially equivalent to a packing bed density of the first column. In some embodiments of the invention, a viscosity of the mobile phase in the separation procedure in the second chromatographic system is substantially equivalent to a viscosity of the mobile phase in the separation procedure in the first chromatographic system. In some of the foregoing methods, a temperature of the second column in the second chromatographic system in the second separation procedure substantially matches a temperature of the first column in the first chromatographic system in the first separation procedure. In some of the foregoing methods, a cosolvent in the carbon dioxide based mobile phase in the second separation procedure substantially matches a cosolvent in the carbon dioxide based mobile phase in the first separation procedure.

BRIEF DESCRIPTION OF THE FIGURES

The foregoing and other features provided by embodiments of the present invention will be more fully understood from the following description when read together with the accompanying drawings.

FIG. 2A illustrates a pressure profile of a chromatographic system in a separation procedure.

FIG. 3A illustrates a pressure profile of a chromatographic system, with a different column than that used in FIG. 2A, in a separation procedure.

DETAILED DESCRIPTION

Figure 1A:
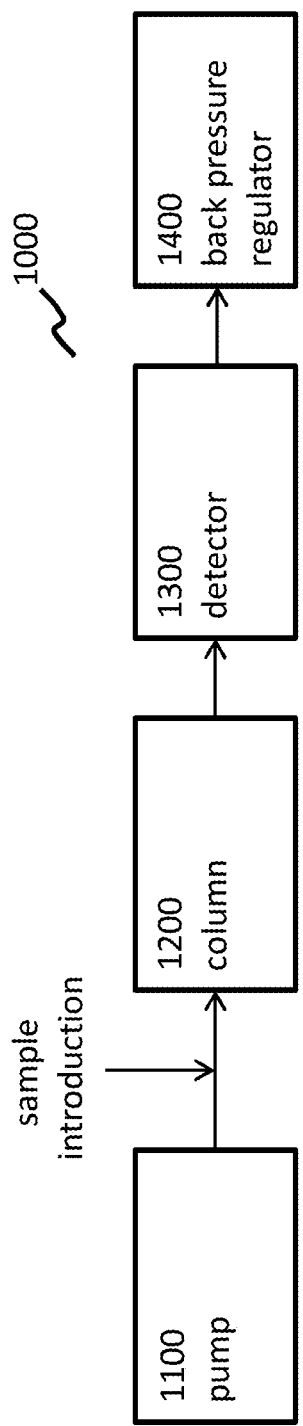
FIG. 1A illustrates an exemplary chromatographic system in accordance with the prior art.

As used herein, the phrase "chromatographic system" refers to a combination of instruments or equipment, e.g., a pump, a column, a detector, and accompanying accessories that may be used to perform a separation to detect target analytes.

In some embodiments, the present disclosure relates to a separation procedure involving a carbon dioxide based mobile phase in a chromatographic system having a pump, a column located downstream of the pump, a detector located downstream of the column, a back pressure regulator located downstream of the detector, and a first sensor and a second sensor. In some such embodiments, the sensors may be pressure sensors for measuring mobile phase pressure in the system. The first sensor may be contained in or connected to an outlet of a pump, may be contained in or connected to an inlet of a column, or positioned anywhere in between. The second sensor may be contained in or connected to an inlet of a back pressure regulator, may be contained in or connected to an outlet of the column, or positioned anywhere in between. Mobile phase pressure measurements may be used, along with measured or estimated mobile phase temperatures, to estimate the mobile phase density.

The present disclosure may be useful for transferring separation procedures involving a carbon dioxide based mobile phase between analytical scale chromatographic systems, preparative scale chromatographic systems, and combinations thereof. For example, the present disclosure may be useful in transferring a separation procedure from an analytical scale chromatographic system to a preparative scale chromatographic system, or a preparative scale chromatographic system to an analytical scale chromatographic system. The present disclosure may also be useful in transferring a separation procedure from one analytical scale chromatographic system to another analytical scale chromatographic system, or from one preparative scale chromatographic system to another preparative scale chromatographic system. A list of chromatographic systems for which the present disclosure may be applicable include, but is not limited to, carbon dioxide-based chromatographic systems commercially available from Waters Technologies Corporation (Milford, Mass.) and branded as ACQUITY® UPC$^2$, Method Station SFC, Resolution SFC MS, Preparative SFC Instruments (e.g., Investigator SFC, Prep 100 SFC, SFC 80/200/350 Preparative Systems). Chromatographic systems for which the present disclosure may be applicable may comprise columns designed for use with a mobile phase including carbon dioxide. In some embodiments, columns designed for use with a carbon dioxide based mobile phase are branded as Waters Technologies Corporation (Milford, Mass.) UPC$^2$ and/or SFC columns including both chiral and achiral stationary phases.

The present disclosure is applicable to chromatographic systems with different columns. For example, the columns in different chromatographic systems may have different particle sizes, lengths, and/or cross-sectional areas. More preferably, the present disclosure may be applied to any chromatographic system with a column difference that results in greater than about a 5% change in overall operating average mobile phase density or average column pressure. Even more preferably, the present disclosure may be applied to any chromatographic system with a column difference that results in greater than about a 10% change in overall operating average mobile phase density or average column pressure.

The present disclosure relates to efficiently transferring a separation procedure involving a carbon dioxide based mobile phase to another chromatographic system. As used herein, the phrase "efficiently transferring" as applied to a separation procedure refers to the concept of transferring a separation procedure, methodology, or method parameters between chromatographic systems while maintaining the chromatographic integrity of the separation, e.g., preserving retention factors and selectivity of at least one target analyte, preferably two or more target analytes. An efficiently transferred separation is one that substantially reproduces the chromatographic integrity of the separation obtained on the first chromatographic system on the second chromatographic system. For example, an efficiently transferred separation procedure involving a carbon dioxide based mobile phase is one wherein the second carbon dioxide based separation procedure performed on the second chromatographic system has a target analyte, or target analytes, having substantially the same retention factor (k') or selectivity as the first separation performed on the first system.

As used herein, the term "retention factor" or "k" refers to the ratio of time an analyte is retained in the stationary phase to the time it is retained in the mobile phase under either isocratic or gradient conditions. For an efficiently transferred separation procedure involving a carbon dioxide-based mobile phase, the difference in retention factor for any given target analyte between a first and a second separation should be minimized. Preferably, the difference in retention factor for a target analyte between a first and a second separation is less than about 10%. More preferably, the difference in retention factor for a target analyte between a first and a second separation is less than about 5%. Even more preferably, the difference in retention factor for a target analyte between a first and a second separation is less than about 1%.

For multiple target analytes, the difference in retention factor for each target analyte, respectively, between the first and second separation procedures should also be minimized. Multiple target analytes may include 2 or more target analytes, e.g., 2, 3, 4, 5, 6, 7, 8, 9, 10, etc. Preferably, all or a majority of the target analytes have substantially the same retention factor between the first and second separation procedures. Because all analytes respond differently to systemic and procedural changes, not all of the target analytes may have substantially the same retention factor between the first and second separation procedures. The difference in retention factor for each of the multiple target analytes, respectively, between the first and second separation procedures is preferably less than about 10%. The difference in retention factor for each of the multiple target analytes, respectively, between the first and second separation procedures is more preferably less than about 7.5%. The difference in retention factor for each of the multiple target analytes, respectively, between the first and second separation procedures is more preferably less than about 5%. Even more preferably, the difference in retention factors for each of the multiple target analytes, respectively, between the first and second separation procedures is more preferably less than about 2.5%. Even more preferably, the difference in retention factors for each of the multiple target analytes, respectively, between the first and second separation procedures is more preferably less than about 1.0%.

When a plurality of target analytes are involved in the chromatography, the difference in the average retention factor between the first and second separation procedures may additionally or alternatively be considered in determining whether a substantial match between the two procedures has been achieved. When a plurality of target analytes are involved in the chromatography, the difference in the average retention factor for a plurality of analytes between the first and second separation procedures is preferably less than about 10%. The difference in the average retention factor for a plurality of analytes between the first and second separation procedures is more preferably less than about 7.5%. The difference in the average retention factor for a plurality of analytes between the first and second separation procedures is more preferably less than about 5.0%. The difference in the average retention factor for a plurality of analytes between the first and second separation procedures is more preferably less than about 2.5%. The difference in the average retention factor for a plurality of analytes between the first and second separation procedures is more preferably less than about 1.0%.

As used herein, the term "selectivity" or "separation factor" or "α" refers to the degree of separation of two analytes in a separation. For example, the separation factor for two analytes, A and B, is the ratio of their respective retention factors, provided A elutes before B, e.g., $\alpha = k'_B/k'_A$. The selectivity between two target analytes between a first and a second separation should be maintained. Preferably, the change in selectivity for two target analytes between the first and the second separation is less than about 10%. More preferably, the change in selectivity for two target analytes between the first and the second separation is less than about 5%. Even more preferably, the change in selectivity for two target analytes between the first and the second separation is less than about 1%.

As used herein, the phrase "separation procedure" refers to method parameters and/or settings used in a chromatographic system to control or effect a separation of target analytes. The mobile phase in a carbon dioxide based mobile phase includes at least, in part, carbon dioxide.

FIG. 1A illustrates a chromatographic system 1000 featuring a pump 1100, a column 1200, a detector 1300, and a back pressure regulator (BPR) 1400. A sample is introduced into chromatographic system 1000 of FIG. 1A between pump 1100 and column 1200. BPR 1400 has a set point. System 1000 experiences pressure dropping from the outlet of pump 1100 to the set point at the inlet of BPR 1400. Typically, the pressure drop will predominately occur between the inlet and the outlet of column 1200.

Figure 1B:
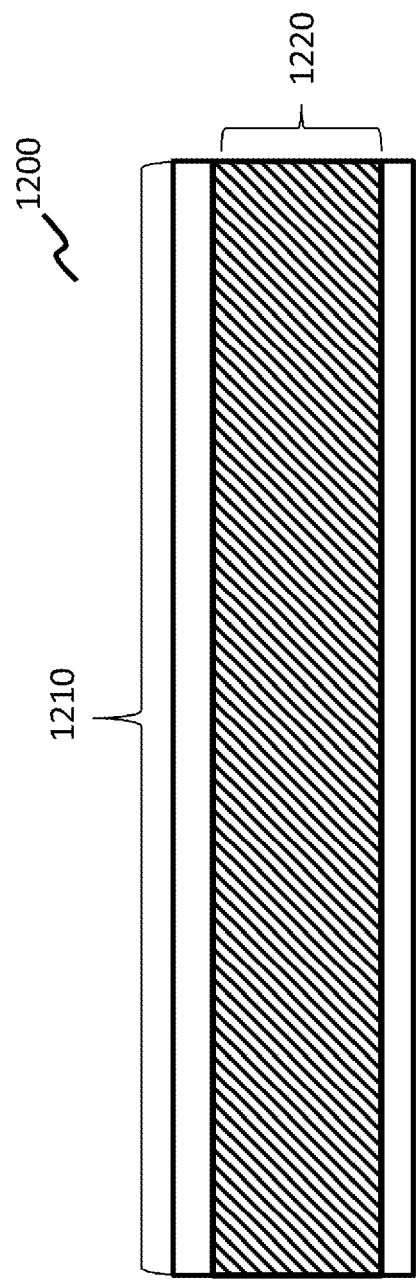
FIG. 1B illustrates an exemplary column for a chromatographic system in accordance with the prior art.

FIG. 1B illustrates a cross-section of column 1200 that may be use in system 1000. Column 1200 features a column length 1210 and a cross-sectional area 1220. The column length 1210 may be the inner length of the column within which media is packed or an approximation thereof. The cross-sectional area 1220 may be the inner cross-sectional area of column 1200 or may be an approximation thereof. The media packed within column 1200 features a particular particle size. In the column 1200 of FIG. 1B, the cross-sectional area 1220 packed with media does not vary along the length 1210 of column 1200. Accordingly, the volume of media packed within the column is defined by the product of the cross-sectional area 1220 and the length 1210.

FIG. 2A illustrates a pressure profile of chromatographic system 1000 featuring a 3×150 mm column with a 5 μm particle size in a separation procedure. As illustrated in FIG. 2A, chromatographic system 1000 features a system pressure and a BPR pressure, which is lower. The system pressure represents the pressure at the outlet of pump 1100. The BPR pressure represents the pressure at the inlet of BPR 1400. The BPR pressure is established by a set point of BPR 1400. As illustrated in FIG. 2A, chromatographic system 1000 experiences pressure dropping from the outlet of pump 1100 to the set point at the inlet of BPR 1400. Typically, the pressure drop will predominately occur between the inlet and the outlet of column 1200. Accordingly, as discussed above the system pressure may be measured by a first sensor contained in or connected to an outlet of a pump, an inlet of a column, or anywhere in between. Similarly, as discussed above the system pressure may be measured by a second sensor contained in or connected to an inlet of a BPR, an outlet of the column, or anywhere in between.

Figure 2B:
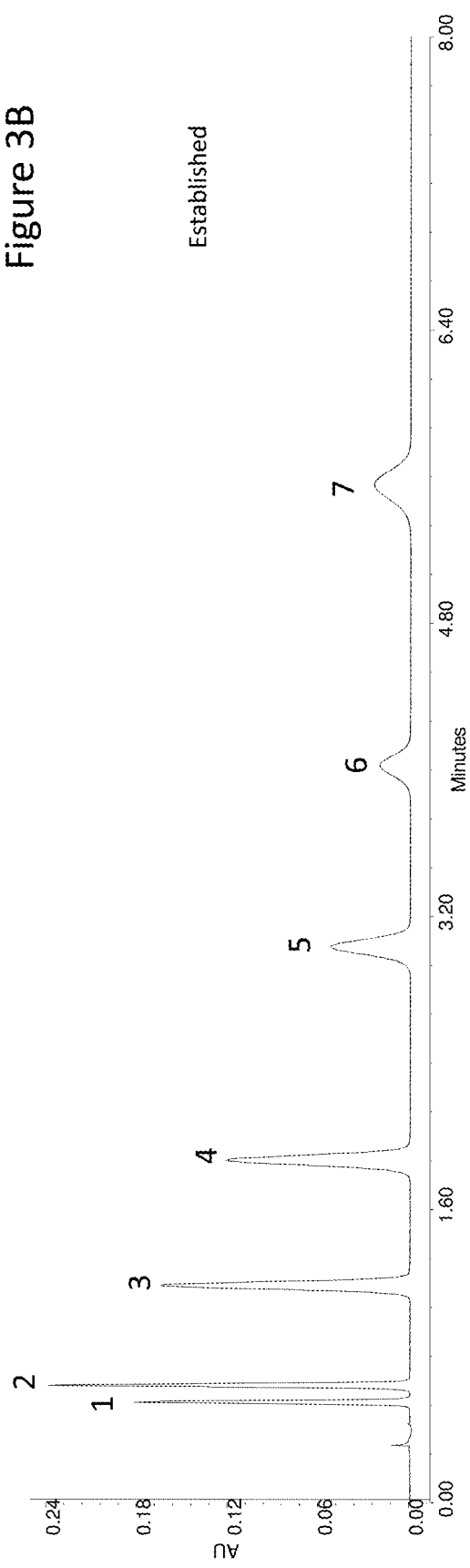
FIG. 2B illustrates chromatography observed from the separation procedure in the chromatographic system of FIG. 2A.

FIG. 2B illustrates chromatography observed from the separation procedure in the chromatographic system of FIG. 2A. The separation procedure of FIG. 2B involves the following parameters: the 3×150 mm column with the 5 µm particle size is run at a temperature of 40° C.; the BPR features a set point of 2900 psi; and the carbon dioxide based mobile phase includes 6% MeOH and features a flow rate of 2.5 mL/min. As illustrated in FIG. 2B, seven peaks were produced in the separation.

FIG. 3A illustrates a pressure profile of chromatographic system 3000 featuring a 3.0×50 mm column with a 1.7 µm particle size in a separation procedure. As illustrated in FIG. 3A, chromatographic system 3000 features a system pressure and a BPR pressure, which is lower. The system pressure represents the pressure at the outlet of pump 3100. As discussed above the system pressure may be measured by a first sensor contained in or connected to an outlet of a pump, an inlet of a column, or anywhere in between. The BPR pressure, which is established by a set point, represents the pressure at the inlet of BPR 3400. As further discussed above the system pressure may be measured by a second sensor contained in or connected to an inlet of a BPR, an outlet of the column, or anywhere in between. The main difference between the system 1000 that produced FIG. 2A and the system 3000 that produced FIG. 3A are the column lengths and the column particle sizes. Although the separation procedures of FIG. 3A and FIG. 2A both feature the same BPR pressure, FIG. 3A features a much higher system pressure than FIG. 2A. The average pressure can be estimated from a linear average of the system and the BPR pressures of the separation procedure. Accordingly, applying that estimation, the average pressure of the separation procedure of FIG. 3A is much higher than the average pressure of the separation of FIG. 2A.

The researchers at Waters Research Corporation disclosed that, due to the compressible nature of a carbon dioxide based mobile phase at or near supercritical conditions, the mobile phase density must be managed from the sample introduction to detection. More specifically, the average density of the mobile phase across the column must be conserved in order to match retention characteristics of the analytes. As noted above, researchers at Waters Technologies Corporation disclosed that the average of the pressure profile may be used as a close approximation of the average density profile to duplicate match retention characteristics of the analytes between separations. Accordingly, the differences in the system pressures of FIGS. 2A and 3A are problematic for transfer of a separation procedure from the chromatographic system of FIG. 2A to the chromatographic system of FIG. 3A. The system pressure differences indicate that the average column pressure of the separation procedure in the chromatographic system of FIG. 3A are greater than the average column pressure of the separation procedure in the chromatographic system of FIG. 2A. Due to the pressure differences in the chromatographic systems, the average density of the mobile phase and, by extension, the retention characteristics of the analytes in the two separations, will be expected to differ.

Figure 3B:
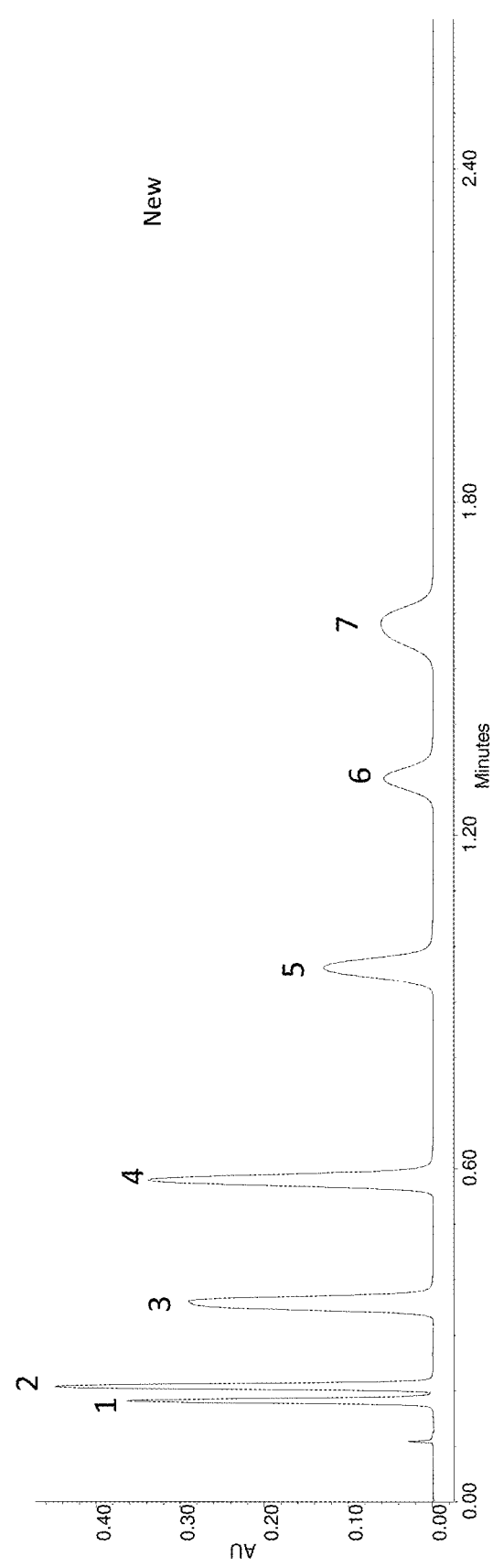
FIG. 3B illustrates chromatography observed from the separation procedure in the chromatographic system of FIG. 3A.

FIG. 3B illustrates chromatography observed from the separation procedure on the 3.0×50 mm column with a 1.7 µm particle size in the chromatographic system 3000 of FIG. 3A. The separation procedure of FIG. 3B involves the following parameters: the 3.0×50 mm column with the 1.7 µm particle size is run at a temperature of 40° C.; the BPR features a set point of 2900 psi; and the carbon dioxide based mobile phase includes 6% MeOH and features a flow rate of 2.5 mL/min. Accordingly, the columns of the separation procedures of FIGS. 2A, 2B, 3A, 3B share the same temperature, the same mobile phase flow rate, and the same mobile phase composition. By the same token, the columns of the separation procedures of FIGS. 2A, 2B, 3A, 3B feature different lengths and particles sizes. As illustrated in FIG. 3B, seven peaks were produced in the separation. Nonetheless, due to the large difference in the average pressure illustrates in FIGS. 2A and 3A, there is a mismatch in the chromatography of FIGS. 2B and 3B.

As disclosed in the prior art, the average column pressure of the mobile phase can be changed by adjusting the set point of the BPR. For example, the set point of the BPR may be selected to address the pressure differences produced in separation procedures in different chromatography systems. For example, a BPR set point in a chromatographic system may be decreased in a separation procedure to reduce the average column pressure. Similarly, a BPR set point in a chromatographic system may be increased in a separation procedure to increase the average column pressure. Thus, by changing the BPR set point used in a separation procedure, one may expect to change the retention characteristics of analytes in the separation procedure.

The inventors of the present disclosure were aware that the BPR set point in a separation procedure using a carbon dioxide based mobile phase at or near SFC conditions in one chromatographic system may be changed to modify an average column pressure produced in a separation procedure using a carbon dioxide based mobile phase at or near SFC conditions in another chromatographic system. But the inventors recognized that an average column pressure may be achieved in a separation procedure in a chromatographic system using a carbon dioxide based mobile phase at or near SFC conditions in a different column without changing the BPR set point. The inventors further recognized that an average column pressure may be achieved in a separation procedure in a chromatographic system using a carbon dioxide based mobile phase at or near SFC conditions in a different column without solely relying on changing the BPR set point.

The inventors of the present disclosure specifically recognized that an effect of a mobile phase density on solubility and analyte retention can be achieved by substantially matching the pressure profile produced in a first separation procedure using a carbon dioxide based mobile phase at or near SFC conditions in a first chromatographic system with a pressure profile produced in a second separation procedure using a carbon dioxide based mobile phase at or near SFC conditions in a second chromatographic system. The pressure profile referenced here is the pressure drop across the column (i.e., between the inlet and outlet of the column). In order to match the pressure profile between two chromatographic systems with different columns having known characteristics, the flow rate for the new separation procedure in the new system can be adjusted to achieve the pressure profile produced by the original separation procedure in the original system.

The relationship between pressure, column dimension, and flow rate can be explained using Darcy's Equation (1).

$$\frac{\Delta P}{L} = \frac{\mu Q}{KA} \quad (1)$$

Where ΔP is the pressure drop across the column, L is the length of the column, μ is the viscosity of the mobile phase, Q is the volumetric flow rate, K is the permeability of the stationary phase, and A is the cross sectional area of the column.

To capture the effect of particle size, we can substitute equation (2) and then rearrange the terms to get equation (3).

$$K = K_0 d_p^2 \quad (2)$$

Where $K_0$ is the permeability constant, and $d_p$ is the particle size in the column.

$$\Delta P = \frac{\mu}{K_0} \left[ \frac{QL}{A\, d_p^2} \right] \quad (3)$$

If we then assume the viscosity of the mobile phase is the same between the systems since the density profile should be equivalent with the same pressure profile; and also assume the columns are packed with equivalent packing bed density, we can establish the same pressure profiles between two systems by maintaining the same ratios as expressed in equation (4) between the two systems.

$$\left[ \frac{QL}{A\, d_p^2} \right]_{system\ 1} = \left[ \frac{QL}{A\, d_p^2} \right]_{system\ 2} \quad (4)$$

Following equation (4), we can see, for any given combination of column cross-sectional area, column length, column particle size, and flow rate in system 1, we can substantially match the pressure profile in system 2, by selecting an appropriate combination of column cross-sectional area, column length, column particle size, and flow rate for another system. For example, when the cross-sectional area, length, and particle size for a column in the second system have been selected, there will be a specific flow rate needed for that second system to substantially recreate the pressure profile of system 1.

With regard to some embodiments of the invention, the inventors recognized that a flow rate of a carbon dioxide based mobile phase can be selected to substantially match the pressure profile produced in a new separation procedure using a carbon dioxide based mobile phase at or near SFC conditions in one chromatographic system with a pressure profile produced in an established separation procedure using a known flow rate of a carbon dioxide based mobile phase at or near SFC conditions in a column featuring known dimensions in another chromatographic system. A flow rate that will produce the ratio of a first system in a second system can be determined by reorganizing equation (4) into equation (5).

$$Q_{s2} = Q_{s1}(L_{s1}*A_{s2}*d_{ps2}^2)/(L_{s2}*A_{s1}*d_{ps1}^2) \quad (5)$$

Figure 4:
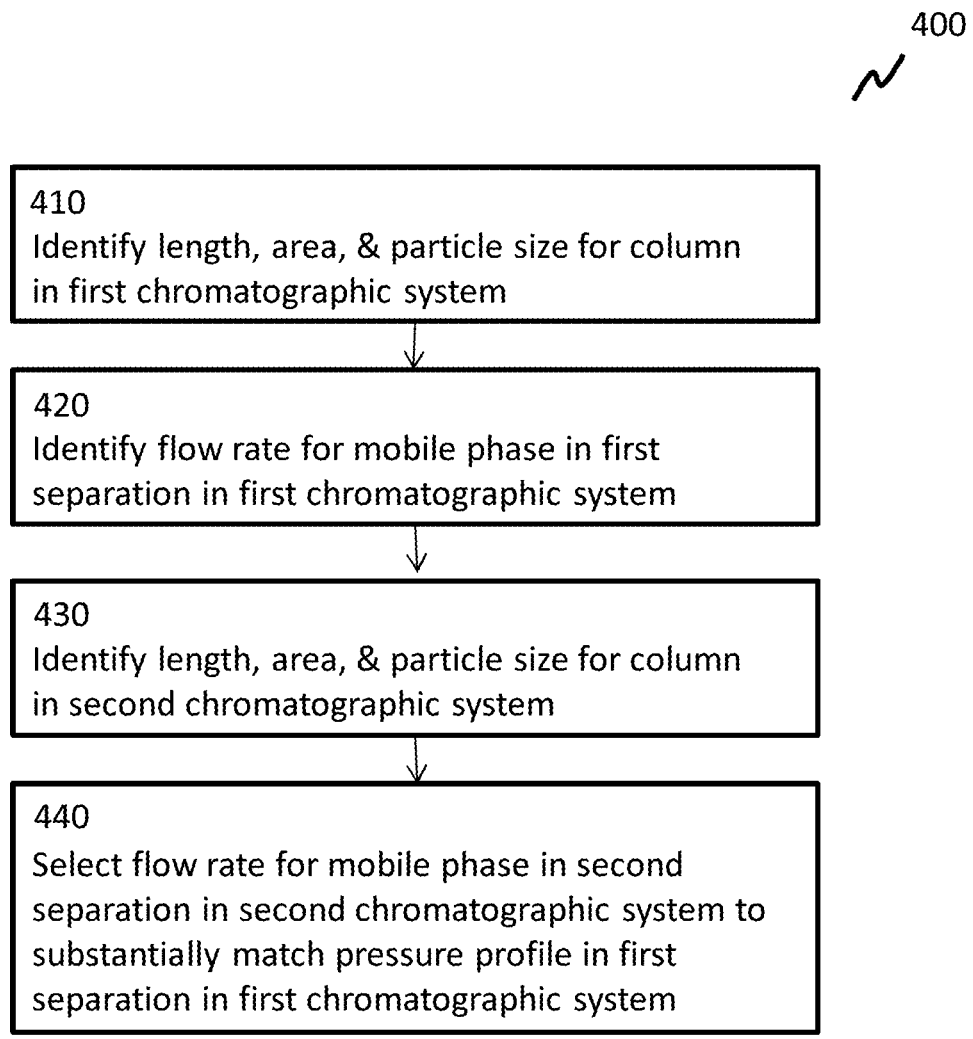
FIG. 4 illustrates a method for efficiently transferring a separation procedure from a first chromatographic system to a second chromatographic system in accordance with embodiments of the invention.

FIG. 4 illustrates a method 400 for efficiently transferring a separation procedure from a first chromatographic systems to a second chromatographic system in accordance with embodiments of the invention. In step 410 of FIG. 4, a length, a cross-sectional area, and a particle size of a column in a chromatographic system used in an established separation procedure is identified. The length, the cross-sectional area, and the particle size will be those of the column of the chromatographic system used in a successful carbon dioxide based separation procedure. The length, the cross-sectional area, and the particle size of the reference column may be known and therefore readily available for identification. For example, the length, the cross-sectional area, and the particle size of the reference column may be identified by mere reference to the know values. If the successful separation procedure is that referenced with respect to FIGS. 2A and 2B, the known cross-sectional area, length, and particle size of the column in the chromatographic system used in that procedure—that is 3×150 mm and 5 μm—is identified. To the extent that the cross-sectional area, length, and particle size of the reference column in the chromatographic system used in the established separation procedure is not known, each may be readily determined by referring to values on the column or by measuring the column itself.

In step 420 of FIG. 4, a flow rate of a carbon dioxide based mobile phase used in the chromatographic system during the established separation procedure is identified. The flow rate of the mobile phase will be that used in a successful carbon dioxide based separation procedure. The flow rate of the mobile phase may be a known parameter of the successful separation procedure and therefore readily available for identification. If the successful separation procedure is that referenced with respect to FIGS. 2A and 2B, the flow rate in the relevant chromatographic system in that procedure—that is a flow rate of 2.5 mL/min—is identified. To the extent that the flow rate of the mobile phase is not known, it may be determined by observing the setting used in the established separation procedure.

Step 430 of FIG. 4 involves a second chromatographic system. The second chromatographic system referenced in step 430 differs from the first chromatographic system referenced in steps 410 and 420. In particular, the column of the second chromatographic system differs from the column of the chromatographic system used to perform the successful separation procedure. Column differences between the two chromatographic systems may include column dimensions, such as length, diameter, and cross-sectional area. Column differences between the two chromatographic systems may include particle diameter. Column stationary phases may also differ in regard to chemistry, base particle, ligand, bonding density, endcapping, pore size, etc. Column manufacturers typically produce columns having the same stationary phase, e.g., same chemistry, same base particle, same ligand, same bonding density, same endcapping and same pore size, in several different particle size and column dimension configurations. In embodiments of the inventions, the two relevant chromatographic systems have a first and a second respective column, wherein the first and second columns have similar stationary phases. The similar stationary phases may have, at least, same chemistry, same base particle, same ligand, same bonding density, same endcapping or same pore size. The present invention is applicable where the columns in two different chromatographic systems have the same stationary phase.

In step 430 of FIG. 4, a cross-sectional area, a length, and a particle size of a column in a chromatographic system to be used in a new separation procedure is identified. The cross-sectional area, the length, and the particle size of the column to be used in the new separation procedure may be known and therefore readily available for identification. For example, the cross-sectional area, the length, and the particle size of the column to be used in the new separation procedure may be identified by mere reference to the known values. If the chromatographic system referenced with respect to FIGS. 3A and 3B is the system to be used in the new separation procedure, the known cross-sectional area, the length, and the particle size of the column in that chromatographic system—that is 3.0×50 mm and 1.7

µm—is identified. To the extent that the cross-sectional area, the length, and the particle size of the column to be used in the new separation procedure is not known, each may be readily determined by referring to values on the column or by measuring the column itself. Alternatively, the cross-sectional area, the length, and the particle size of the column to be used in the new separation procedure may be selected from the available columns.

In step 440 of FIG. 4, a flow rate of the carbon dioxide based mobile phase for use in the chromatographic system during the new separation procedure is selected. The flow rate is selected so that the pressure profile produced in the new separation procedure in the second chromatographic system substantially matches the pressure profile produced in the established separation procedure in the reference chromatographic system. A target flow rate to achieve that purpose may be calculated from the available information. Reference is made to equation (5) for calculating the target flow rate. The target flow rate is the product of (a) the flow rate for the carbon dioxide based mobile phase in the first separation procedure; (b) the quotient of a dividend of the length of the first column and a divisor of the length of the second column; (c) the quotient of a dividend of the area of the second column and a divisor of the area of the first column; and (d) the quotient of a particle size of the second column and a divisor of the particle size of the first column.

Using the separation procedure referenced with respect to FIGS. 2A and 2B as the reference separation procedure, an exemplary target flow rate for use in a new separation procedure in the chromatographic system referenced with respect to FIGS. 3A and 3B may be calculated. The exemplary target flow rate is the product of (a) the flow rate used in the procedure referenced with respect to FIGS. 2A and 2B—that is 2.5 mL/min; (b) the quotient of a dividend of the length of the column used with respect to FIGS. 2A and 2B and a divisor of the length of the column used with respect to FIGS. 3A and 3B—that is 150 mm divided by 50 mm; (c) the quotient of a dividend of the area of the column used with respect to FIGS. 3A and 3B and a divisor of the area of the column used with respect to FIGS. 2A and 2B—that is 3.0 mm divided by 19 mm—that is 3 mm divided by 3 mm; and (d) the quotient of a square of the particle size of the second column and a divisor of a square of the particle size of the first column—that is the square of 5 µm divided by the square of 1.7 µm. Performing the foregoing calculation results in a target flow rate of 0.7 mL/min for use in a new separation procedure in the chromatographic system referenced with respect to FIGS. 3A and 3B.

Figure 5A:
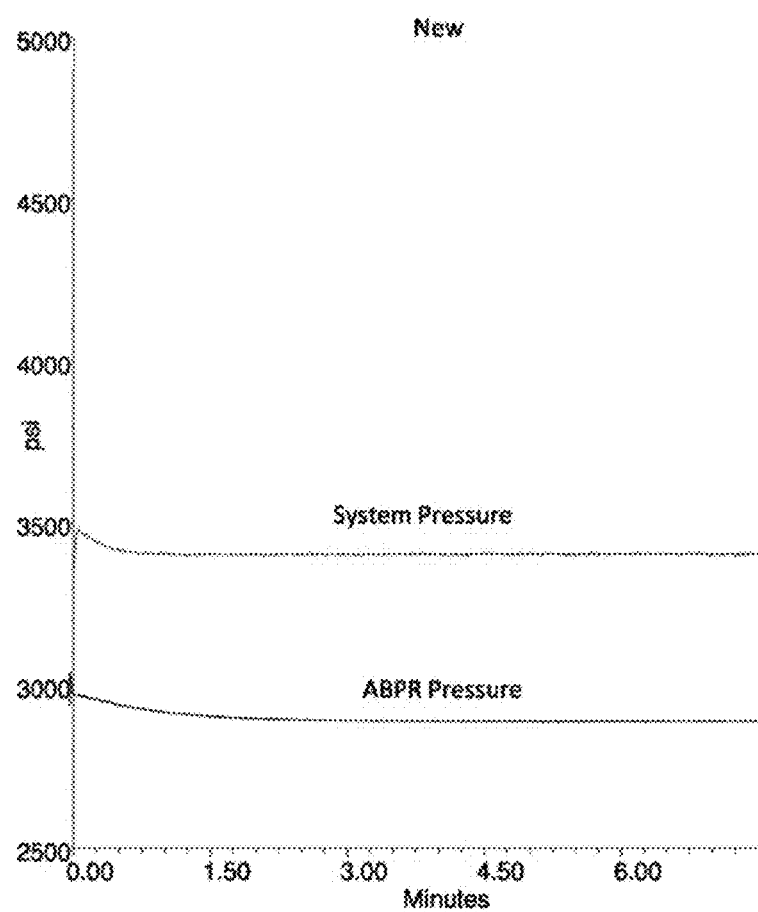
FIG. 5A illustrates a pressure profile of the chromatographic system of FIG. 3A in different separation procedure.

FIG. 5A illustrates a pressure profile of chromatographic system featuring a 3.0×50 mm column in a new separation procedure with a flow rate selected to better match the pressure profile of the separation procedure in the system referenced in FIGS. 2A and 2B. FIG. 5A illustrates a pressure profile of a separation procedure on a chromatographic system similar to that illustrated in FIG. 3A. The separation procedure on the chromatographic system of FIG. 5A differs from that of FIG. 3A in that a new flow rate for the mobile phase was used to better match the separation procedure in the system referenced in FIGS. 2A and 2B. The separation procedures of FIGS. 2A, 3A, and FIG. 5A all feature the same BPR pressure. As compared to FIG. 3A, FIG. 5A features a lower system pressure. The system pressure of FIG. 5A is much closer to that of FIG. 2A than that of FIG. 3A.

Figure 5B:
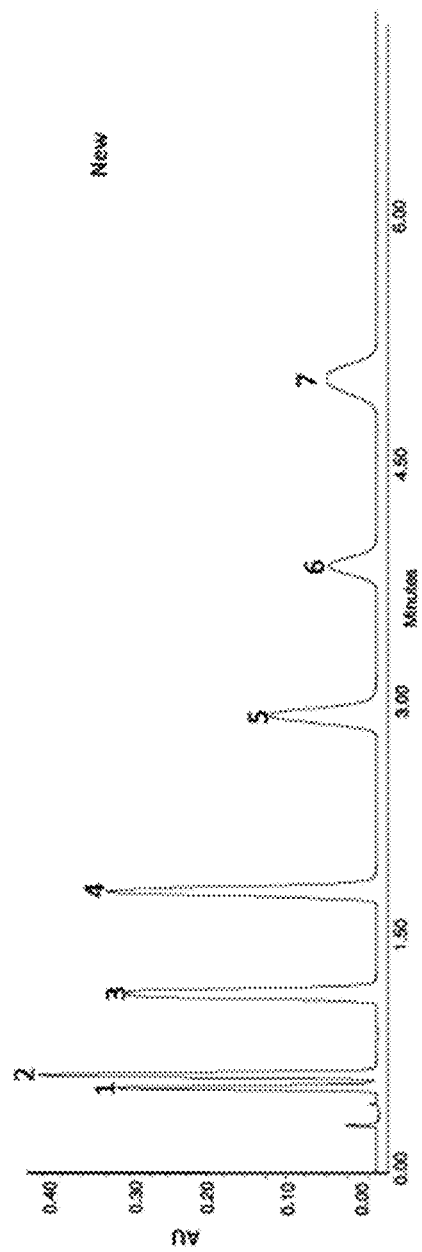
FIG. 5B illustrates chromatography observed from the separation procedure and system of FIG. 5A.

FIG. 5B illustrates chromatography observed from the separation procedure on the 3.0×50 mm and 1.7 µm column in the chromatographic system of FIG. 5A. The separation procedure of FIG. 5B involves the following parameters: the 3.0×50 mm and 1.7 µm column is run at a temperature of 40° C.; the BPR features a set point of 2900 psi; and the carbon dioxide based mobile phase includes 6% MeOH and features a flow rate of 0.9 mL/min. Accordingly, the columns of the separation procedures of FIGS. 2A, 2B, 5A, 5B share the same temperature and the same mobile phase composition. By the same token, the columns of the separation procedures of FIGS. 2A, 2B, 5A, 5B feature different lengths and particle sizes and different mobile phase flow rates. Nonetheless, the seven peaks produced in the separation illustrated in FIG. 5B more closely match the chromatography results illustrated in FIG. 2B (than the previous results with the same new column illustrated in FIG. 3B).

Table 1 below includes the retention factors for each of the peaks of the three chromatography results:

TABLE 1

| Retention Factors | (System 2A &2B) 5 µm 3 × 150 mm 2.5 mL/min | (System 3A &3B) 1.7 µm 3 × 50 mm 2.5 mL/min | (System 3A &3B) 1.7 µm 3 × 50 mm 0.9 mL/min |
|---|---|---|---|
| peak 1 | 0.75 | 0.67 | 0.80 |
| peak 2 | 1.05 | 0.91 | 1.07 |
| peak 3 | 2.78 | 2.32 | 2.79 |
| peak 4 | 4.96 | 4.32 | 4.92 |
| peak 5 | 8.67 | 7.83 | 8.62 |
| peak 6 | 11.82 | 10.95 | 11.76 |
| peak 7 | 16.69 | 13.51 | 15.69 |

The second column of Table 1 includes the retention factors for each of the peaks of the chromatography illustrated in FIGS. 2A and 2B. The third column of Table 1 includes the retention factors for each of the corresponding peaks of the chromatography illustrated in FIGS. 3A and 3B. The fourth column of Table 1 includes the retention factors for each of the corresponding peaks of the chromatography illustrated in FIGS. 5A and 5B. Again the primary difference between the separation procedure illustrated in FIGS. 3A and 3B and the separation procedure illustrated in FIGS. 5A and 5B is the use of a lower mobile phase flow rate in the later separation procedure.

The retention factors of the corresponding peaks in the chromatography results can be compared quantitatively with equation (6):

$$\frac{|k'_{S_1} - k'_{S_2}|}{(k'_{S_1} + k'_{S_2})/2} \times 100 \tag{6}$$

Where $k'_{S_1}$ is the retention factor in the established separation procedure, and $k'_{S_2}$ is the retention factor in the new separation procedure.

Table 2 below includes the percentage differences for each of the peaks produced by a new separation procedure in a new chromatography system as compared to the corresponding peaks produced by the established separation procedure in the original chromatography system (illustrated in FIGS. 2A and 2B):

TABLE 2

|  | % Difference System 2A &2B to System 3A &3B | % Difference System 2A &2B to System 5A &5B |
|---|---|---|
| peak 1 | 11.27 | 6.45 |
| peak 2 | 14.29 | 1.89 |

TABLE 2-continued

| | % Difference System 2A &2B to System 3A &3B | % Difference System 2A &2B to System 5A &5B |
|---|---|---|
| peak 3 | 18.04 | 0.36 |
| peak 4 | 13.79 | 0.81 |
| peak 5 | 10.18 | 0.58 |
| peak 6 | 7.64 | 0.51 |
| peak 7 | 21.06 | 6.18 |
| average | 13.75 | 2.40 |

The percentage differences in Table 2 were calculated using the values from Table 1 and equation (6). As Table 2 demonstrates, the selection of a mobile phase flow rate closer to the flow rate calculated from equation (5) produces peaks with retention factors that more closely match those of the established separation procedure illustrated in FIGS. 2A and 2B. Whereas the 2.5 mL/min mobile flow rate in the separation procedure illustrated in FIGS. 3A and 3B produced a peak 1 retention factor more than 11% different than that of the established procedure, the lower 0.9 mL/min mobile flow rate in the separation procedure illustrated in FIGS. 5A and 5B produced a peak 1 retention factor more than 4 percentage points closer to that of the established procedure. Whereas the 2.5 mL/min mobile flow rate in the separation procedure illustrated in FIGS. 3A and 3B produced a peak 3 retention factor more than 18% different than that of the established procedure, the lower 0.9 mL/min mobile flow rate in the separation procedure illustrated in FIGS. 5A and 5B produced a peak 3 retention factor more than 17 percentage points closer to that of the established procedure. Importantly, whereas the 2.5 mL/min mobile flow rate in the separation procedure illustrated in FIGS. 3A and 3B produced an average peak retention factor more than 13% different than that of the established procedure, the lower 0.9 mL/min mobile flow rate in the separation procedure illustrated in FIGS. 5A and 5B produced an average peak retention factor more than 11 percentage points closer to that of the established procedure. As illustrated by Table 2, all of the percentage differences in retention factors are improved by using a flow rate that more closely matches the target flow rate calculated from equation (5). The results of the separation procedure illustrated in FIGS. 5A and 5B substantially matches the results of the separation procedure illustrated in FIGS. 2A and 2B.

The criteria for substantially matching the retention factor of an established separation procedure with a new procedure may be, for example, the difference between the retention factor for each peak is less than 7.5% and the average difference in the retention factors for all the peaks is less than 2.5%. The criteria for substantially matching the retention factor of an established separation procedure with a new procedure may be, for example, the average difference in the retention factors for all the peaks is less than 5%, less than 4%, or less than 3%.

As illustrated by the previous example, the selected flow rate may be a flow rate substantially similar to the target flow rate calculated from equation (5). For example, the selected flow rate may be the achievable flow rate closest to the target flow rate. The selected flow rate may be the target flow rate rounded off to the nearest flow rate with an appropriate number of decimals. The selected flow rate may be a flow rate that may be selected in the new chromatographic system closest to the target flow rate. The selected flow rate may be a flow rate that may be selected in the new chromatographic system that is the nearest flow rate greater than the target flow rate. The selected flow rate may be a flow rate that may be selected in the new chromatographic system that is the nearest flow rate less than the target flow rate.

Other parameters for use in the chromatographic system during the new separation procedure may substantially match those of the established separation procedure. For example, a pressure setting of a back pressure regulator in the chromatographic system to be used in the new separation procedure may substantially match a pressure setting of a back pressure regulator in the chromatographic system used in the established separation procedure. A temperature of the column in the chromatographic system to be used in the new separation procedure may substantially match a temperature of the column in the chromatographic system used in the established separation procedure. A cosolvent in the mobile phase in the chromatographic system to be used in the new separation procedure may substantially match a cosolvent in the mobile phase in the chromatographic system used in the established separation procedure. A portion of cosolvent in the mobile phase in the chromatographic system to be used in the new separation procedure may substantially match a portion of cosolvent in the mobile phase in the chromatographic system used in the established separation procedure.

As previously suggested, the particle sizes of the media in the column in the chromatographic system used in the established separation procedure and of the media in the column in the chromatographic system to be used in the new separation procedure may differ. In an embodiment of method 400 of FIG. 4, any differences in the particle sizes of the media in the columns are addressed in calculating a target flow rate.

With regard to other embodiments of the invention, the inventors recognized that a length of a column in one chromatographic system can be selected to substantially match the pressure profile produced in a new separation procedure using a known flow rate of a carbon dioxide based mobile phase at or near SFC conditions in a column featuring a known cross-sectional area with a pressure profile produced in an established separation procedure using a known flow rate of a carbon dioxide based mobile phase at or near SFC conditions in a column featuring known dimensions in another chromatographic system. A column length that will produce the ratio of a first system in a second system can be determined by reorganizing equation (4) into equation (7)

$$L_{s2}=L_{s1}(Q_{s1}*A_{s2}*d_{ps2}^2)/(Q_{s2}*A_{s1}*d_{ps1}^2) \quad (7)$$

Figure 6:
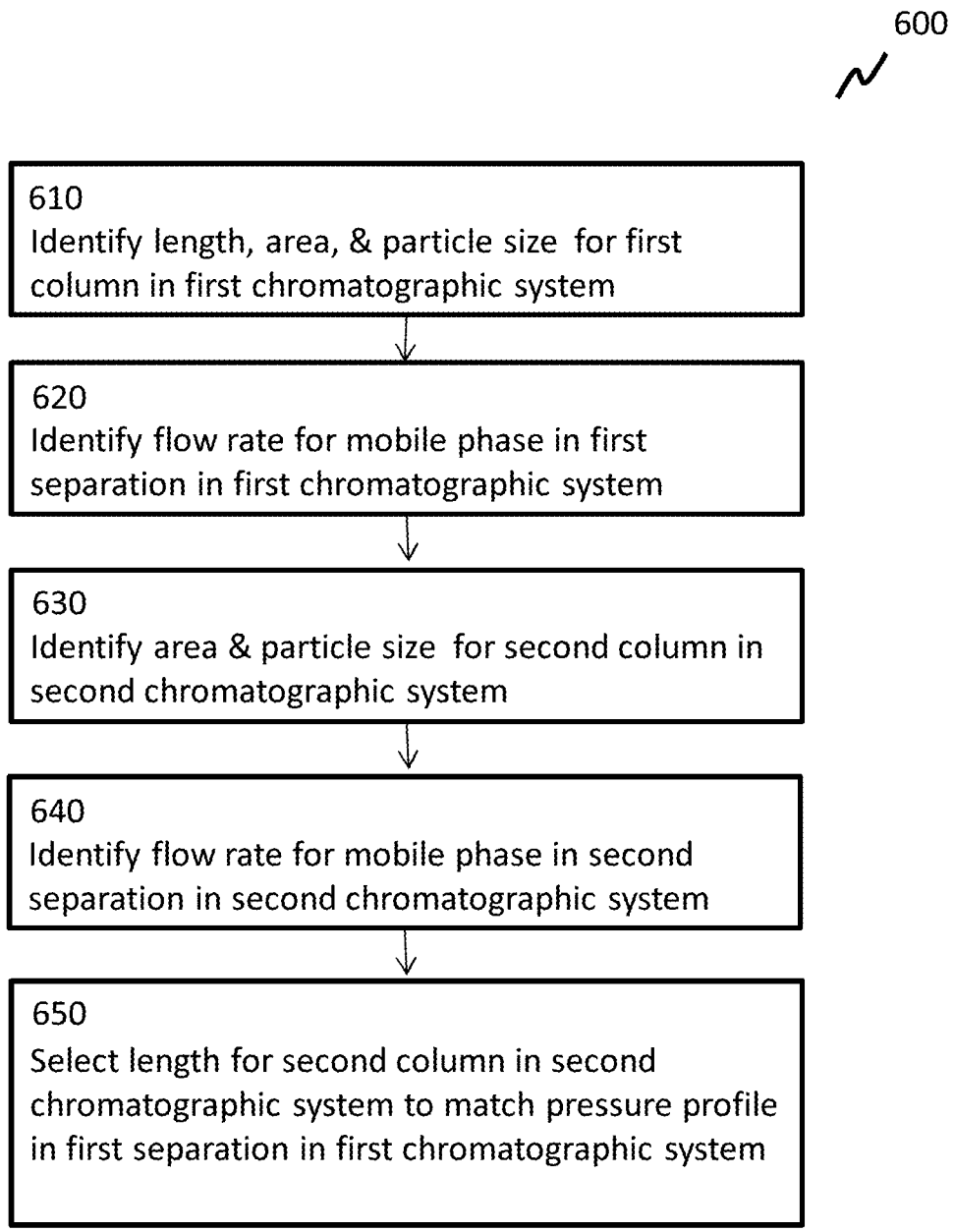
FIG. 6 illustrates a method for efficiently transferring a separation procedure from a first chromatographic system to a second chromatographic system in accordance with embodiments of the invention.

FIG. 6 illustrates a method 600 for efficiently transferring a separation procedure from a first chromatographic systems to a second chromatographic system in accordance with embodiments of the invention. Like step 410 of FIG. 4, step 610 of FIG. 6 involves identifying a length, a cross-sectional area, and a particle size of a column in a chromatographic system used in an established separation procedure. The length, cross-sectional area, and particle size will be those of the column of the chromatographic system used in a successful carbon dioxide based separation procedure. Step 610 is similar to step 410, and the variations described above with respect to step 410 apply.

Like step 420 of FIG. 4, step 620 of FIG. 6 involves identifying a flow rate of a carbon dioxide based mobile phase used in the chromatographic system during the established separation procedure. The flow rate of the mobile phase will be that used in a successful carbon dioxide based separation procedure. Step 620 is similar to step 420, and the variations described above with respect to step 420 apply.

Like step 430 of FIG. 4, step 630 of FIG. 6 involves a second chromatographic system. Similar to step 430, the column of the second chromatographic system referenced in step 630 differs from the column of first chromatographic system referenced in steps 610 and 620. Similar to step 430 of FIG. 4, step 630 of FIG. 6 involves identifying a cross-sectional area and a particle size of a column in a chromatographic system to be used in a new separation procedure. Step 630 is similar to step 430, and the variations described above with respect identifying a cross-sectional area and a particle size of a column in step 430 apply.

In step 640 of FIG. 6, a flow rate of the carbon dioxide based mobile phase for use in the chromatographic system during the new separation procedure is identified. The mobile phase flow rate for use in the new separation procedure may have been chosen already and therefore readily available for identification. The identified flow rate may be identified based on the capabilities of the chromatographic system to be used in the new separation procedure. The flow rate may be identified somewhat arbitrarily.

In step 650 of FIG. 6, a length of the column to be used in the chromatographic system during the new separation procedure is selected. The length of the column is selected so that the pressure profile produced in the new separation procedure in the second chromatographic system substantially matches the pressure profile produced in the established separation procedure in the reference chromatographic system. A target length of the column to achieve that purpose may be calculated from the available information. Reference is made to equation (7) for calculating the target length of the column. The target length of the column is the product of (a) the length for the first column in the first chromatographic system, (b) the quotient of a dividend of the cross-sectional area of the second column and a divisor of the cross-sectional area of the first column, (c) the quotient of a dividend of the flow rate for the carbon dioxide based mobile phase in the first separation procedure and a divisor of the flow rate for the carbon dioxide based mobile phase in the second separation procedure; and (d) the quotient of a square of the particle size of the second column and a divisor of a square of the particle size of the first column.

The selected length of the column may be a length substantially similar to the target length. For example, the selected length may be the length of an available column closest to the target length. The selected length may be the target length rounded off to the nearest length with an appropriate number of decimals. The selected cross-sectional area may be a length of an available column selected as having the length nearest to, but greater than, the target length. The selected length may be a length of an available column selected as having the length nearest to, but less than, the target length.

As in method 400 of FIG. 4, in method 600 of FIG. 6, other parameters for use in the chromatographic system during the new separation procedure may substantially match those of the established separation procedure. For example, a pressure setting of a back pressure regulator in the chromatographic system to be used in the new separation procedure may substantially match a pressure setting of a back pressure regulator in the chromatographic system used in the established separation procedure. A temperature of the column in the chromatographic system to be used in the new separation procedure may substantially match a temperature of the column in the chromatographic system used in the established separation procedure. A cosolvent in the mobile phase in the chromatographic system to be used in the new separation procedure may substantially match a cosolvent in the mobile phase in the chromatographic system used in the established separation procedure. A portion of cosolvent in the mobile phase in the chromatographic system to be used in the new separation procedure may substantially match a portion of cosolvent in the mobile phase in the chromatographic system used in the established separation procedure.

Again, the particle sizes of the media in the column in the chromatographic system used in the established separation procedure and of the media in the column in the chromatographic system to be used in the new separation procedure may differ. In an embodiment of method 600, any differences in the particle sizes of the media in the columns are addressed in the calculation of the target length of the column.

With regard to other embodiments of the invention, the inventors recognized that a cross-sectional area of a column in one chromatographic system can be selected to substantially match the pressure profile produced in a new separation procedure using a known flow rate of a carbon dioxide based mobile phase at or near SFC conditions in a column featuring a known length with a pressure profile produced in an established separation procedure using a known flow rate of a carbon dioxide based mobile phase at or near SFC conditions in a column featuring known dimensions in another chromatographic system. A column cross-sectional area that will produce the ratio of a first system in a second system can be determined by reorganizing equation (4) into equation (8)

$$A_{s2} = A_{s1}(Q_{s2}*L_{s2}*d_{ps1}^2)/(Q_{s1}*L_{s1}*d_{ps2}^2) \qquad (8)$$

Figure 7:
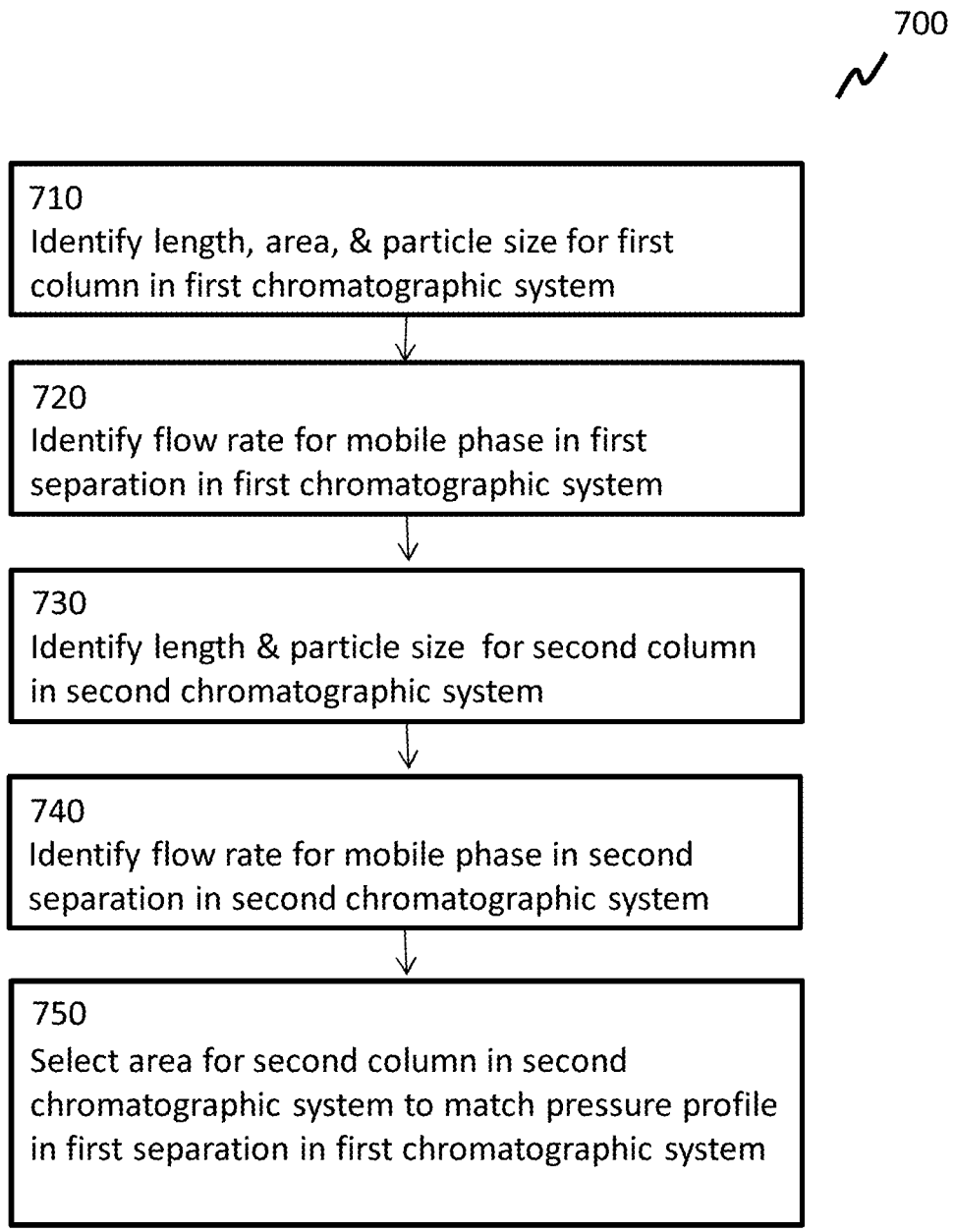
FIG. 7 illustrates a method for efficiently transferring a separation procedure from a first chromatographic system to a second chromatographic system in accordance with embodiments of the invention.

FIG. 7 illustrates a method 700 for efficiently transferring a separation procedure from a first chromatographic systems to a second chromatographic system in accordance with embodiments of the invention. Like step 410 of FIG. 4 and step 610 of FIG. 6, step 710 of FIG. 7 involves identifying a length, a cross-sectional area, and a particle size of a column in a chromatographic system used in an established separation procedure. The length, cross-sectional area, and particle size will be those of the column of the chromatographic system used in a successful carbon dioxide based separation procedure. Step 710 is similar to step 410, and the variations described above with respect to step 410 apply.

Like step 420 of FIG. 4 and step 620 of FIG. 6, step 720 of FIG. 7 involves identifying a flow rate of a carbon dioxide based mobile phase used in the chromatographic system during the established separation procedure. The flow rate of the mobile phase will be that used in a successful carbon dioxide based separation procedure. Step 720 is similar to step 420, and the variations described above with respect to step 420 apply.

Like step 430 of FIG. 4 and step 630 of FIG. 6, step 730 of FIG. 7 involves a second chromatographic system. Similar to step 430, the column of the second chromatographic system referenced in step 730 differs from the column of first chromatographic system referenced in steps 710 and 720. Similar to step 430 of FIG. 4, step 730 of FIG. 7 involves identifying a length and a particle size of a column in a chromatographic system to be used in a new separation procedure. Step 730 is similar to step 430, and the variations described above with respect identifying a length and a particle size of a column in step 430 apply.

In step 740 of FIG. 7, a flow rate of the carbon dioxide based mobile phase for use in the chromatographic system during the new separation procedure is identified. The mobile phase flow rate for use in the new separation procedure may have been chosen already and therefore readily available for identification. The identified flow rate may be identified based on the capabilities of the chromatographic system to be used in the new separation procedure. The flow rate may be identified somewhat arbitrarily.

In step 750 of FIG. 7, a cross-sectional area of the column to be used in the chromatographic system during the new separation procedure is selected. The cross-sectional area of the column is selected so that the pressure profile produced in the new separation procedure in the second chromatographic system substantially matches the pressure profile produced in the established separation procedure in the reference chromatographic system. A target cross-sectional area of the column to achieve that purpose may be calculated from the available information. Reference is made to equation (8) for calculating the target cross-sectional area of the column. The target cross-sectional area of the column is the product of (a) the cross-sectional area of the first column in the first chromatographic system; (b) the quotient of a dividend of the length of the second column and a divisor of the length of the first column; (c) the quotient of a dividend of the flow rate for the carbon dioxide based mobile phase in the second separation procedure and a divisor of the flow rate for the carbon dioxide based mobile phase in the first separation procedure; and (d) the square of the quotient of a dividend of the size of the particles in the first column and a divisor of the size of the particles in the second column.

The selected cross-sectional area of the column may be a cross-sectional area substantially similar to the target cross-sectional area. For example, the selected cross-sectional area may be the cross-sectional area of an available column closest to the target cross-sectional area. The selected cross-sectional area may be the target cross-sectional area rounded off to the nearest cross-sectional area with an appropriate number of decimals. The selected cross-sectional area may be a cross-sectional area of an available column selected as having the cross-sectional area nearest to, but greater than, the target cross-sectional area. The selected cross-sectional area may be a cross-sectional area of an available column selected as having the cross-sectional area nearest to, but less than, the target cross-sectional area.

As in method 400 of FIG. 4, in method 700 of FIG. 7, other parameters for use in the chromatographic system during the new separation procedure may substantially match those of the established separation procedure. For example, a pressure setting of a back pressure regulator in the chromatographic system to be used in the new separation procedure may substantially match a pressure setting of a back pressure regulator in the chromatographic system used in the established separation procedure. A temperature of the column in the chromatographic system to be used in the new separation procedure may substantially match a temperature of the column in the chromatographic system used in the established separation procedure. A cosolvent in the mobile phase in the chromatographic system to be used in the new separation procedure may substantially match a cosolvent in the mobile phase in the chromatographic system used in the established separation procedure. A portion of cosolvent in the mobile phase in the chromatographic system to be used in the new separation procedure may substantially match a portion of cosolvent in the mobile phase in the chromatographic system used in the established separation procedure.

Again, the particle sizes of the media in the column in the chromatographic system used in the established separation procedure and of the media in the column in the chromatographic system to be used in the new separation procedure may differ. In an embodiment of method 700, any differences in the particle sizes of the media in the columns are addressed in the calculation of the target length of the column.

With regard to other embodiments of the invention, the inventors recognized that the particle size of a column in one chromatographic system can be selected to substantially match the pressure profile produced in a new separation procedure using a known flow rate of a carbon dioxide based mobile phase at or near SFC conditions in a column featuring known dimensions, and with a pressure profile produced in an established separation procedure using a known flow rate of a carbon dioxide based mobile phase at or near SFC conditions in a column featuring known dimensions and a known particle size in another chromatographic system. A column particle size that will produce the ratio of a first system in a second system can be determined by reorganizing equation (4) into equation (9)

$$d_{ps2}=d_{ps1}\sqrt{[(Q_{s2}*L_{s2}*A_{s1})/(Q_{s1}*L_{s1}*A_{ps})]} \qquad (9)$$

Figure 8:
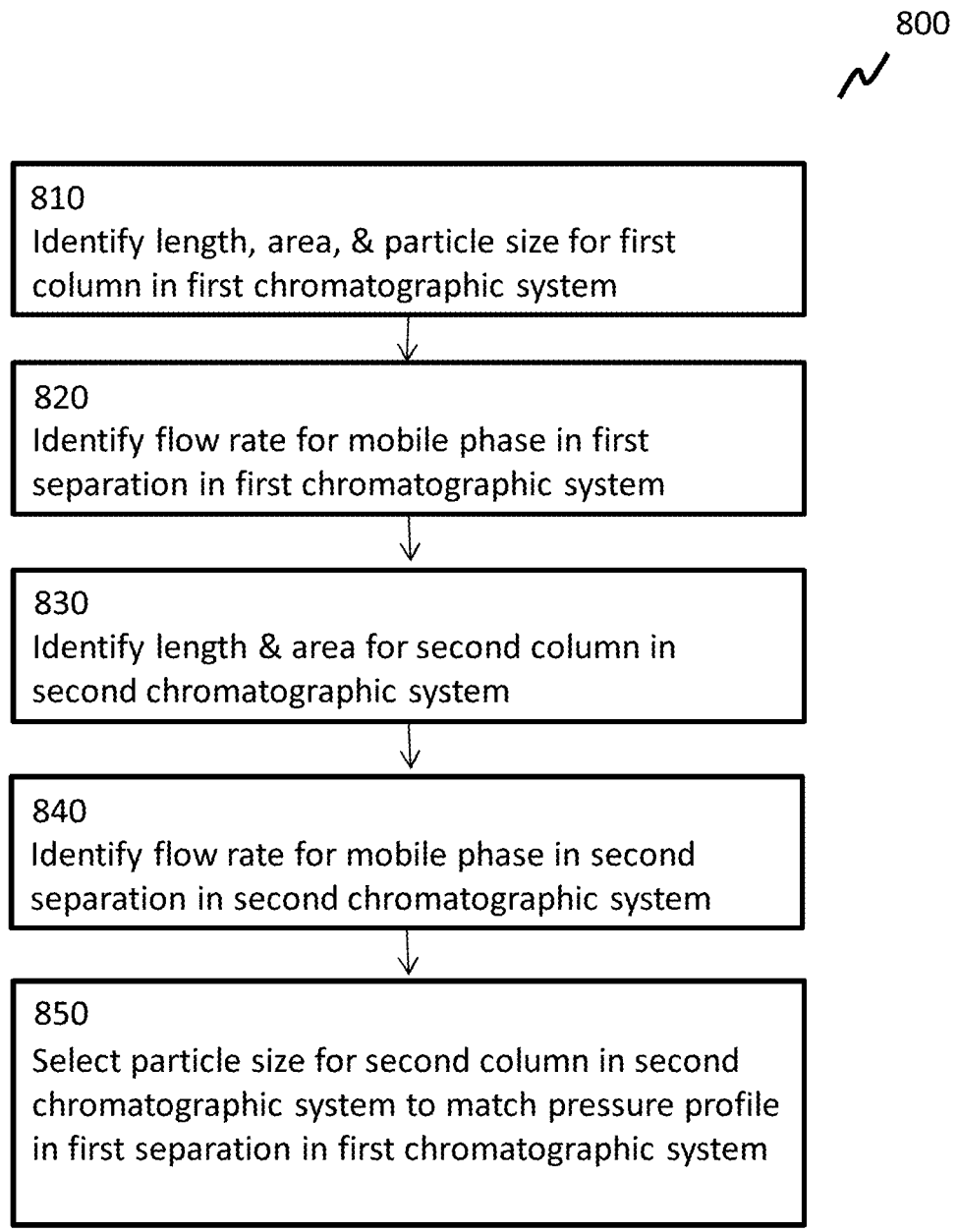
FIG. 8 illustrates a method for efficiently transferring a separation procedure from a first chromatographic systems to a second chromatographic system in accordance with embodiments of the invention.

FIG. 8 illustrates a method 800 for efficiently transferring a separation procedure from a first chromatographic systems to a second chromatographic system in accordance with embodiments of the invention. Like step 410 of FIG. 4, step 810 of FIG. 8 involves identifying a length, a cross-sectional area, and a particle size of a column in a chromatographic system used in an established separation procedure. The length, cross-sectional area, and particle size will be those of the column of the chromatographic system used in a successful carbon dioxide based separation procedure. Step 810 is similar to step 410, and the variations described above with respect to step 410 apply.

Like step 420 of FIG. 4, step 820 of FIG. 8 involves identifying a flow rate of a carbon dioxide based mobile phase used in the chromatographic system during the established separation procedure. The flow rate of the mobile phase will be that used in a successful carbon dioxide based separation procedure. Step 820 is similar to step 420, and the variations described above with respect to step 420 apply.

Like step 430 of FIG. 48, step 830 of FIG. 8 involves a second chromatographic system. Similar to step 430, the column of the second chromatographic system referenced in step 830 differs from the column of first chromatographic system referenced in steps 810 and 820. Similar to step 430 of FIG. 4, step 830 of FIG. 8 involves identifying a length and a cross-sectional area of a column in a chromatographic system to be used in a new separation procedure. Although it involves a different chromatographic system, step 830 is similar to step 410, and the variations described above with respect identifying a length and a cross-sectional area of a column in step 410 apply.

In step 840 of FIG. 8, a flow rate of the carbon dioxide based mobile phase for use in the chromatographic system during the new separation procedure is identified. The mobile phase flow rate for use in the new separation procedure may have been chosen already and therefore readily available for identification. The identified flow rate may be identified based on the capabilities of the chromatographic system to be used in the new separation procedure. The flow rate may be identified somewhat arbitrarily.

In step 850 of FIG. 8, a particle size of the column to be used in the chromatographic system during the new separation procedure is selected. The particle size of the column is selected so that the pressure profile produced in the new separation procedure in the second chromatographic system substantially matches the pressure profile produced in the established separation procedure in the reference chromatographic system. A target particle size of the column to achieve that purpose may be calculated from the available information. Reference is made to equation (9) for calculating the target particle size of the column. The target particle size of the column is the product of (a) the particle size of the first column in the first chromatographic system; and (b) the square root of the product of (1) the quotient of a dividend of the flow rate for the carbon dioxide based mobile phase in the second separation procedure and a divisor of the flow rate for the carbon dioxide based mobile phase in the first separation procedure; (2) the quotient of a dividend of the length of the second column and a divisor of the length of the first column; and (3) the quotient of a dividend of the cross-sectional area the first column and a divisor of the cross-sectional area of the second column.

The selected particle size of the column may be a particle size substantially similar to the target particle size area. For example, the selected particle size may be the particle size of an available column having a particle size closest to the target particle size. The selected particle size may be the target particle size rounded off to the nearest particle size with an appropriate number of decimals. The selected particle size may be a particle size of an available column selected as having the particle size nearest to, but greater than, the target particle size. The selected particle size area may be a particle size of an available column selected as having the particle size nearest to, but less than, the target particle size.

As in method 400 of FIG. 4, in method 800 of FIG. 8, other parameters for use in the chromatographic system during the new separation procedure may substantially match those of the established separation procedure. For example, a pressure setting of a back pressure regulator in the chromatographic system to be used in the new separation procedure may substantially match a pressure setting of a back pressure regulator in the chromatographic system used in the established separation procedure. A temperature of the column in the chromatographic system to be used in the new separation procedure may substantially match a temperature of the column in the chromatographic system used in the established separation procedure. A cosolvent in the mobile phase in the chromatographic system to be used in the new separation procedure may substantially match a cosolvent in the mobile phase in the chromatographic system used in the established separation procedure. A portion of cosolvent in the mobile phase in the chromatographic system to be used in the new separation procedure may substantially match a portion of cosolvent in the mobile phase in the chromatographic system used in the established separation procedure.

The inventors further recognized that the disclosed methods for efficiently transferring a carbon dioxide based separation from a first chromatographic system to a second chromatographic system may be combined with other known methods. For example, if the selected flow rate for the new separation procedure in the second chromatographic system is not close enough to the target flow rate, the set point of the back pressure regulator may also be adjusted to match the average column pressure of the established separation procedure. Similarly, if the selected cross-sectional area of the column in the chromatographic system to be used in the new separation procedure is not close enough to the target cross-sectional area, the set point of the back pressure regulator and/or the flow rate may also be adjusted to match the average column pressure of the established separation procedure. Also, if the selected length of the column in the chromatographic system to be used in the new separation procedure is not close enough to the target length, the set point of the back pressure regulator and/or the flow rate may also be adjusted to match the average column pressure of the established separation procedure.

What is claimed is:

1. A method for efficiently transferring a separation procedure from a first chromatographic system comprising a first column to a second chromatographic system comprising a second column, the method comprising:
   (a) identifying a length, a cross-sectional area, and a particle size for the first column in the first chromatographic system;
   (b) identifying a flow rate for a carbon dioxide based mobile phase in a first separation procedure in the first chromatographic system; and
   (c) selecting a combination of a length, a cross-sectional area, and a particle size for the second column and a flow rate for the carbon dioxide based mobile phase in a second separation procedure in the second chromatographic system; and
   (d) performing a second separation procedure in the second chromatographic system having the second column such that a pressure profile for the second separation procedure in the second chromatographic system substantially matches a pressure profile for the first separation procedure in the first chromatographic system,
   wherein the pressure profile in the first separation procedure in the first chromatographic system is represented by the quotient of a dividend of the product of the flow rate for the carbon dioxide based mobile phase in the first separation procedure and the length of the first column and a divisor of the product of the cross-sectional area and the square of particle size of the first column, and
   wherein the pressure profile in the second separation procedure in the second chromatographic system is represented by the quotient of a dividend of the product of the flow rate for the carbon dioxide based mobile phase in the second separation procedure and the length of the second column and a divisor of the product of the cross-sectional area and the square of particle size of the second column.

2. The method of claim 1 wherein a pressure setting of a back pressure regulator in the second separation procedure in the second chromatographic system substantially matches a pressure setting of a back pressure regulator in the first separation procedure in the first chromatographic system.

3. The method of claim 1 wherein a packing bed density of the second column is substantially equivalent to a packing bed density of the first column.

4. The method of claim 1 wherein a viscosity of the mobile phase in the second separation procedure in the second chromatographic system is substantially equivalent to a viscosity of the mobile phase in the first separation procedure in the first chromatographic system.

5. The method of claim 1 wherein a temperature of the second column in the second separation procedure in the second chromatographic system substantially matches a temperature of the first column in the first separation procedure in the first chromatographic system.

6. The method of claim 1 wherein the step of (c) selecting a combination of a length, a cross-sectional area, and a particle size for the second column and a flow rate for the carbon dioxide based mobile phase in a second separation procedure in the second chromatographic system comprises:
   identifying a length, a cross-sectional area, and a particle size for the second column; and selecting a target flow rate for the carbon dioxide based mobile phase in the second separation procedure in the second chromatographic system based on a product of:
the flow rate for the carbon dioxide based mobile phase in the first separation procedure in the first chromatographic system,
the quotient of a dividend of the length of the first column and a divisor of the length of the second column,
the quotient of a dividend of the cross-sectional area of the second column and a divisor of the cross-sectional area of the first column, and
the square of the quotient of a dividend of the size of the particles in the second column and a divisor of the size of the particles in the first column.

7. The method of claim 1 wherein the step of (c) selecting a combination of a length, a cross-sectional area, and a particle size for the second column and a flow rate for the carbon dioxide based mobile phase in a second separation procedure in the second chromatographic system comprises:
identifying a length and a particle size for the second column and a flow rate for the carbon dioxide based mobile phase in the second separation procedure in the second chromatographic system; and
selecting a target cross-sectional area for the second column based on a product of:
the cross-sectional area for the first column,
the quotient of a dividend of the flow rate for the carbon dioxide based mobile phase in the second separation procedure in the second chromatographic system and a divisor of the flow rate for the carbon dioxide based mobile phase in the first separation procedure in the first chromatographic system,
the quotient of a dividend of the length of the second column and a divisor of the length of the first column, and
the square of the quotient of a dividend of the size of the particles in the first column and a divisor of the size of the particles in the second column.

8. The method of claim 1 wherein the step of (c) selecting a combination of a length, a cross-sectional area, and a particle size for the second column and a flow rate for the carbon dioxide based mobile phase in a second separation procedure in the second chromatographic system comprises:
identifying a cross-sectional area and a particle size for the second column and a flow rate for the carbon dioxide based mobile phase in the second separation procedure in the second chromatographic system; and
selecting a target length for the second column based on a product of:
the length for the first column,
the quotient of a dividend of the flow rate for the carbon dioxide based mobile phase in the first separation procedure in the first chromatographic system and a divisor of the flow rate for the carbon dioxide based mobile phase in the second separation procedure in the second chromatographic system,
the quotient of a dividend of the cross-sectional area of the second column and a divisor of the cross-sectional area of the first column, and
the square of the quotient of a dividend of the size of the particles in the second column and a divisor of the size of the particles in the first column.

9. The method of claim 1 wherein the step of (c) selecting a combination of a length, a cross-sectional area, and a particle size for the second column and a flow rate for the carbon dioxide based mobile phase in a second separation procedure in the second chromatographic system comprises:
identifying a cross-sectional area and a length for the second column and a flow rate for the carbon dioxide based mobile phase in the second separation procedure in the second chromatographic system; and
selecting a target particle size for the second column based on a product of:
the particle size for the first column, and
the square root of the product of:
the quotient of a dividend of the flow rate for the carbon dioxide based mobile phase in the second separation procedure in the second chromatographic system and a divisor of the flow rate for the carbon dioxide based mobile phase in the first separation procedure in the first chromatographic system,
the quotient of a dividend of the length of the second column and a divisor of the length of the first column, and
the quotient of a dividend of the cross-sectional area of the first column and a divisor of the cross-sectional area of the second column.

* * * * *